US006667709B1

United States Patent
Hansen et al.

(10) Patent No.: US 6,667,709 B1
(45) Date of Patent: Dec. 23, 2003

(54) METHOD AND APPARATUS FOR DETECTING LEAKS IN BURIED PIPES BY USING A SELECTED COMBINATION OF GEOPHYSICAL INSTRUMENTS

(75) Inventors: Thorkild Hansen, Brighton, MA (US); Michael L. Oristaglio, Newtown, CT (US)

(73) Assignee: Witten Technologies Inc., Boston, MA (US)

( * ) Notice: Subject to any disclaimer, the term of this patent is extended or adjusted under 35 U.S.C. 154(b) by 0 days.

(21) Appl. No.: 10/341,638

(22) Filed: Jan. 14, 2003

(51) Int. Cl.[7] ............................. G01S 3/02; G01S 13/86
(52) U.S. Cl. ............................. 342/22; 342/52; 342/56; 324/326; 324/329; 367/118; 367/128; 367/135; 73/592
(58) Field of Search .......................... 342/22, 52, 56; 367/118, 128, 135; 324/326, 329; 73/592

(56) References Cited

U.S. PATENT DOCUMENTS 6,525,539 B2 * 2/2003 Birken et al. ............... 324/329
6,590,519 B2 * 7/2003 Miceli et al. ................ 342/22
2003/0135328 A1 * 7/2003 Burns et al. ................. 342/52

* cited by examiner

Primary Examiner—Daniel T. Pihulic
(74) Attorney, Agent, or Firm—Fulbright & Jaworski LLP (57) ABSTRACT

A method and apparatus for detecting and locating leaks in buried pipes is disclosed in which ground penetrating radar, induction, acoustic, and vacuum excavation systems are selected based on soil conditions and then employed in selected combinations. The conductivity and wave speed of the soil are used in the selection process and in the process of detecting and locating a leak based on the measurements obtained from the selected combination of detection systems.

31 Claims, 3 Drawing Sheets

METHOD AND APPARATUS FOR DETECTING LEAKS IN BURIED PIPES BY USING A SELECTED COMBINATION OF GEOPHYSICAL INSTRUMENTS

FIELD OF THE INVENTION

This invention relates to a method and apparatus for detecting leaks in buried pipes using a selected combination of geophysical instruments including ground penetrating radar, electromagnetic induction tools, acoustic sensors, and vacuum excavation.

SUMMARY OF THE INVENTION

A method for detecting and locating leaks in buried pipes by radar and induction is disclosed comprising the steps of transmitting a ground penetrating radar signal into a subsurface region, receiving a return radar signal for the subsurface region, processing the return radar signal to create a processed return radar signal, transmitting an inductive signal into the subsurface region, receiving a return inductive signal from the subsurface region, processing the return inductive signal to create a processed return inductive signal, and combining the processed return radar signal and the processed return inductive signal to detect and locate a leak in the subsurface region.

In one embodiment of the invention, the step of processing the return radar signal further comprises using a layer model of the subsurface region. In another embodiment, the step of processing the return radar signal further comprises using multistatic transmitter-receiver geometry. In a further embodiment, the step of processing the return radar signal further comprises detecting an angular change in a straight pipe radar image.

In one embodiment, the step of transmitting an inductive signal further comprises using transient fields. In another embodiment, the step of transmitting an inductive signal further comprises using single-frequency fields.

In a further embodiment, the subsurface region includes a wet soil region and the step of processing the return inductive signal further comprises using a spherical model of the wet soil region. In an additional embodiment, the step of processing the return inductive signal further comprises using a layered model of the subsurface region.

An additional embodiment further comprises the steps of identifying from the processed return radar signal and the processed return inductive signal a first region within the subsurface region having a first wave speed and a first conductivity, identifying from the processed return radar signal and the processed return inductive signal a second region within the subsurface region disjoint from the first region and having a second wave speed and a second conductivity, and detecting a leak in the second region if (1) the second wave speed is less than the first wave speed and if (2) the second conductivity is greater than the first conductivity.

In a further embodiment, the combining step further comprises the steps of identifying from the processed return radar signal and the processed return inductive signal a first region within the subsurface region having a first wave speed and a first conductivity, identifying from the processed return radar signal and the processed return inductive signal a second region within the subsurface region disjoint from the first region and having a second wave speed and a second conductivity, and detecting a leak in the second region if (1) the second wave speed is less than the first wave speed and if (2) the second conductivity is greater than the first conductivity and if (3) a vacuum excavator indicates the presence of a leak in the second region.

Also disclosed is a method for detecting and locating leaks in buried pipes by radar, induction, and acoustic listening comprising the steps of transmitting a ground penetrating radar signal into a subsurface region, receiving a return radar signal from the subsurface region, processing the return radar signal to create a processed return radar signal, transmitting an inductive signal into the subsurface region, receiving a return inductive signal from the subsurface region, processing the return inductive signal to create a processed return inductive signal, receiving an acoustic signal with an acoustic listening device, processing the acoustic signal to create a processed return acoustic signal, and combining the processed return radar signal, the processed return inductive signal, and the processed acoustic signal to detect and locate a leak in the subsurface region.

In one embodiment, the step of processing the return acoustic signal further comprises using a leak-sound enhancer. In another embodiment, vacuum excavation is applied.

In yet another embodiment, the combining step further comprises the steps of identifying from the processed return radar signal and the processed return inductive signal a first region within the subsurface region having a first wave speed and a first conductivity, identifying from the processed return radar signal and the processed return inductive signal a second region within the subsurface region disjoint from the first region and having a second wave speed and a second conductivity, and detecting a leak in the second region if (1) the second wave speed is less than the first wave speed and if (2) the second conductivity is greater than the first conductivity and if (3) the processed acoustic signal indicates the presence of a leak in the second region.

In another embodiment, the combining step further comprises the steps of identifying from the processed return radar signal and the processed return inductive signal a first region within the subsurface region having a first wave speed and a first conductivity, identifying from the processed return radar signal and the processed return inductive signal a second region within the subsurface region disjoint from the first region and having a second wave speed and a second conductivity, and detecting a leak in the second region if (1) the second wave speed is less than the first wave speed and if (2) the second conductivity is greater than the first conductivity and if (3) the processed acoustic signal indicates the presence of a leak in the second region and if (4) a vacuum excavator indicates the presence of a leak in the second region.

Also disclosed is an apparatus for detecting a leak in a buried pipe, comprising a ground penetrating radar transmitter for transmitting a radar signal into a subsurface region, a radar receiver for receiving a return radar signal from the subsurface region, a radar signal processor for processing the return radar signal to create a processed return radar signal, an inductive signal transmitter for transmitting an inductive signal into the subsurface region, an inductive receiver for receiving a return inductive signal from the subsurface region, an inductive signal processor for processing the return inductive signal to create a processed return inductive signal, and a data processor for combining the processed return radar signal and the processed return inductive signal to detect and locate a leak in the subsurface region.

A further embodiment comprises processing circuitry for identifying from the processed return radar signal and the processed return inductive signal a first region within the subsurface region having a first wave speed and a first conductivity and for identifying from the processed return radar signal and the processed return inductive signal a second region within the subsurface region disjoint from the first region and having a second wave speed and a second conductivity, and detection circuitry for detecting a leak in the second region if (1) the second wave speed is less than the first wave speed and if (2) the second conductivity is greater than the first conductivity.

In another embodiment, the radar signal processor uses a layer model of the subsurface region. In a additional embodiment, the radar signal processor further comprises processor circuitry for detecting an angular change in a straight pipe radar image.

In one embodiment, the radar signal processor uses multistatic transmitter-receiver geometry. In another embodiment, the inductive signal transmitter uses transient fields. In a further embodiment, the inductive signal transmitter uses single-frequency fields.

One embodiment further comprises an acoustic listening device receiving an acoustic signal and wherein the data processor further combines the acoustic signal with the processed return radar signal and the processed return inductive signal to detect and locate a leak in the subsurface region. In an additional embodiment, a vacuum excavator is used to verify a leak detected and located by the data processor.

Also disclosed is a method for detecting a leak in a pipe buried in soil comprising determining the conductivity of the soil, determining the wave speed of the soil, selecting a first leak detector and a second leak detector based on the conductivity and the wave speed, applying the first leak detector to the soil to receive a first return signal, applying the second leak detector to the soil to receive a second return signal, and combining the first return signal and the second return signal to detect the leak.

In one embodiment, the first leak detector is a ground penetrating radar system and the second leak detector is an induction system. In a second embodiment, the first leak detector is a ground penetrating radar system and the second leak detector is an acoustic system. In a third embodiment, the first leak detector is a ground penetrating radar system and the second leak detector is a vacuum excavator. In a fourth embodiment, the first leak detector is an induction system and the second leak detector is an acoustic system. In a fifth embodiment, the first leak detector is an induction system and the second leak detector is a vacuum excavator. In a sixth embodiment, the first leak detector is an acoustic system and the second leak detector is a vacuum excavator.

INTRODUCTION

In many water distribution systems a significant percentage of water is lost while in transit from treatment plants to consumers. According to an inquiry made in 1991 by the International Water Supply Association (IWSA), the amount of lost or "unaccounted for" water is typically in the range of 20 to 30% of production. Unaccounted for water is usually attributed to several causes including leakage, metering errors, and theft—but leakage is the major cause. In addition to environmental and economic losses caused by leakage, leaky pipes pose a public health risk as leaks are potential entry points for contaminants if a pressure drop occurs in the system. The present invention is directed toward providing a method and apparatus for detecting leaks in buried pipes.

BACKGROUND TECHNOLOGY

At least four different technologies have been used separately for the detection of leaks in buried pipes: acoustic listening devices, ground penetrating radar, inductive measurements, and vacuum excavation.

Acoustic Listening Devices

A water distribution system may be checked for leaks by using acoustic equipment that detects the sound or vibration induced by water as it escapes from pipes under pressure. Acoustic equipment include listening devices such as listening rods, aquaphones (or sono-scopes), and geophones (or ground microphones). These devices are used to listen for leak sounds at contact points along the pipe such as fire hydrants or valves. Acoustic equipment also may include leak noise correlators that measure leak signals (sound or vibration) at two points that bracket a suspected leak. The position of the leak is then determined automatically based on the time shift between the leak signals calculated using the cross-correlation method that is well known to those of skill in the art.

One such acoustic device is the "Magic Carpet" provided by Mecon, Ltd. The "magic carpet" is an acoustic leak detection array consisting of a plastic carpet in which an array of acoustic sensors is embedded. The array is designed to detect the acoustic signal from a leak in a buried pipe. A signal processing and display unit is attached to the mat by an umbilical cable. When there is a leak in a pipe beneath the carpet, the display indicates the position and strength of the leak. It is generally possible to give a position of a leak that is accurate to within 30 cm. The magic carpet can be operated by one person after only one hour of training. It can be folded up for ease of storage and transport and can be quickly deployed. The magic carpet comes ready for use on hard top surfaces such as tarmac, concrete and pavement, and gravel. Adaptors are also supplied that allow it to be used on unconsolidated surfaces such as grass verges. While generally used to locate leaks in water pipes, there is no reason in principle why it should not be used on pipelines carrying any fluid or gas.

Generally, acoustic leak detection equipment is considered to be satisfactory by most professional operators, but only for metallic pipes. In the case of plastic pipes, the effectiveness of existing acoustic equipment is not well established or documented. The equipment was developed mainly with metallic pipes in mind, and the acoustical characteristics of leak signals in plastic and metallic pipes differ significantly. Plastic pipes are "quieter" and do not transmit sound or vibration as efficiently as metallic pipes. Problems that are normally encountered with locating leaks with acoustic equipment (e.g., interfering traffic signals and attenuation of leak signals along pipes) become more detrimental in the case of plastic pipes. Consequently, most operators are skeptical about the effectiveness of acoustic leak detection equipment for non-metallic pipes, which is a serious problem in view of the increasing use of plastic pipes in water distribution systems worldwide.

Ground Penetrating Radar

A second method for detecting leaks in buried pipes is by using ground penetrating radar. In particular, ground penetrating radar data can be processed to obtain high-resolution three-dimensional images of discontinuities in the electrical parameters of the subsurface. The presence of such discontinuities may reveal buried utility lines (plastic, metal, clay, or cement), changes in soil types, or an interface between dry soil and wet soil.

Radar data can also be processed with a layered model of the subsurface to determine the wave speed as a function of depth, thereby detecting wet soil regions where the wave speed is much lower than in surrounding dry soil regions.

A general introduction to ground penetrating radar can be found in D. J. Daniels, Surface-Penetrating Radar, IEE Press, 1996 ("Daniels"), and M. L. Oristaglio, D. Miller, and J. Haldorsen, "Ground Probing Radar," in Scattering, R. Pike and P. Sabatier, eds., Academic Press, 2002 ("Oristalgio"). A radar system that is particularly useful for surveying large areas is the WTI CART system, which is described in B. Johansson, A. Witten, and A. J. Devaney, "Ground penetrating radar array and timing circuit," PCT Application PCT/US00/24610 ("Johansson, et al."). The WTI CART system employs an array of radar antennas and precise geometry control, as described in Maclyn Burns, et al., "Method For Merging Position Information With Measurements And Filtering To Obtain High-Quality Images That Are Positioned Accurately With Respect To Global Coordinates," U.S. patent application Ser. No. 10/097,713 published as U.S. 2003/c135328.

As discussed in Daniels, the radar response for a large class of nonmagnetic soils can be fully characterized by two frequency-dependent parameters: the permittivity and the conductivity. Radar can in principle determine both of these parameters, although in practice it determines permittivity more reliably than conductivity. In the parameter region where the radar works, the permittivity determines the speed of the radar waves, and the conductivity determines their attenuation. The radar works well and can penetrate down to several meters in soils that have low conductivity. In highly conductive soils, however, the radar waves fail to penetrate deeply, and the results of the radar survey are less useful.

Inductive Measurements

A third method for detecting leaks in buried pipes is through the use of inductive measurements. Inductive methods are sensitive only to the conductivity of the subsurface and can therefore not detect changes in the permittivity. (The permittivity does not appear in the equations that govern the inductive electromagnetic fields.) Data obtained from inductive surveys can be processed to obtain an approximate conductivity distribution of the subsurface. Approximate conductivity distributions obtained from inductive methods typically have lower resolution than the permittivity distributions obtained from radar surveys. Metal pipes cause a strong discontinuity in the conductivity distribution and are thus easy to detect with inductive methods. Typically, clay and cement pipes do not create strong discontinuities in the conductivity distribution and are therefore more difficult to detect with inductive methods. However, if a clay or cement pipe has a sufficiently large diameter and carries fresh water with a very low conductivity, then the conductivity void thus created in the subsurface may be detectable by the inductive methods. Inductive systems can be divided into two classes: time-domain inductive systems and frequency-domain inductive systems.

Time-domain inductive systems are described in J. D. McNeill, "Application of transient electromagnetic techniques," Geonics Limited, Technical Note TN-7, 1980 ("McNeill I") and in Thorkild Hansen and Mike Oristaglio, "Method and apparatus for detecting and locating buried pipes in conductive soils by inducing and measuring transient eddy currents," U.S. patent application Ser. No. 10/117, 133.

Time-domain inductive systems employ a transmitter loop with an impressed transient current that induces eddy currents in the subsurface. The eddy currents decay with time and "stay on" longer in regions with high conductivity than in regions with low conductivity. That is, in highly conductive regions of the subsurface the transient eddy currents decay more slowly with time than in highly resistive regions. The receiver of the inductive system records the magnetic fields emitted by the induced eddy currents. As in McNeill I, layer and sphere models may be used to pinpoint the extent and location of a region with high conductivity, such as the wet soil region surrounding a leak.

Frequency-domain inductive systems are described in J. D. McNeill, "Electromagnetic terrain conductivity measurement at low induction numbers," Geonics Limited, Technical Note TN-6, 1980 ("McNeill II") and in Ralf Birken and Thorkild Hansen, "Apparatus and Method for Locating Subsurface Objects in Conductive Soils by Induction Measurements," U.S. patent application Ser. No. 09/808,976 ("Birken"), now U.S. Pat. No. 6,525,539.

Frequency-domain inductive systems impress a time harmonic current in the transmitter loop, and the receiver records the quadrature component of the magnetic field emitted by the currents that are induced in the subsurface. As shown in McNeill II, this quadrature component is closely related to the conductivity of the subsurface. The varying transmitter-receiver spacing of the array inductive system described in Birken allows for a varying depth of investigation, which can be used to determine the subsurface conductivity as a function of depth.

Vacuum Excavation

A fourth method for detecting leaks in buried pipes is vacuum excavation. Vacuum excavation uses the kinetic energy in a high velocity air stream to penetrate, expand, and break-up soil. The loosened soil and rocks are then removed by using a very powerful vacuum. In this way, a hole is created that is typically one to two feet square and as deep as required to expose the buried utility.

The vacuum excavator does not directly detect the electrical parameters of the subsurface, but instead collects soils samples and uncovers subsurface structures such as buried utility lines. Vacuum excavation works in all soil conditions and constitutes a method that is completely orthogonal to radar and induction. Ditchwitch and Vermeer are two of the major manufacturers of vacuum excavators.

Small test pits may be efficiently created with vacuum excavation to verify leaks predicted by surface geophysical surveys carried out with ground penetrating radar and inductive measurements. Also, with vacuum excavation one can verify the location of water pipes that have been identified through surface geophysical surveys.

There are situations in which each of these methods is unable to accurately detect the location of a leak. For example, induction techniques may incorrectly identify a high-conductivity region of the soil as a wet soil region or may fail to detect a leak when the wet and dry regions have the same conductivity. Radar may be unable to penetrate highly conductive soil regions. An objective of the present invention is to provide a method and apparatus for leak detection that is able to detect leaks in a wide variety of soil regions.

DETAILED DESCRIPTION

The present invention is an apparatus and a method for detecting leaks in water pipes by combining a number of complimentary physical measurements and vacuum excavation. The physical measurements may include ground-penetrating radar (GPR), induction measurements, and acoustic listening, as well as other measurements known to those of skill in the art such as, for example, nuclear magnetic resonance or active acoustic methods. The transmitters and receivers for these measurements may all be mounted on a single vehicle that can be moved along the ground surface, as shown in FIG. 1.

Figure 1:
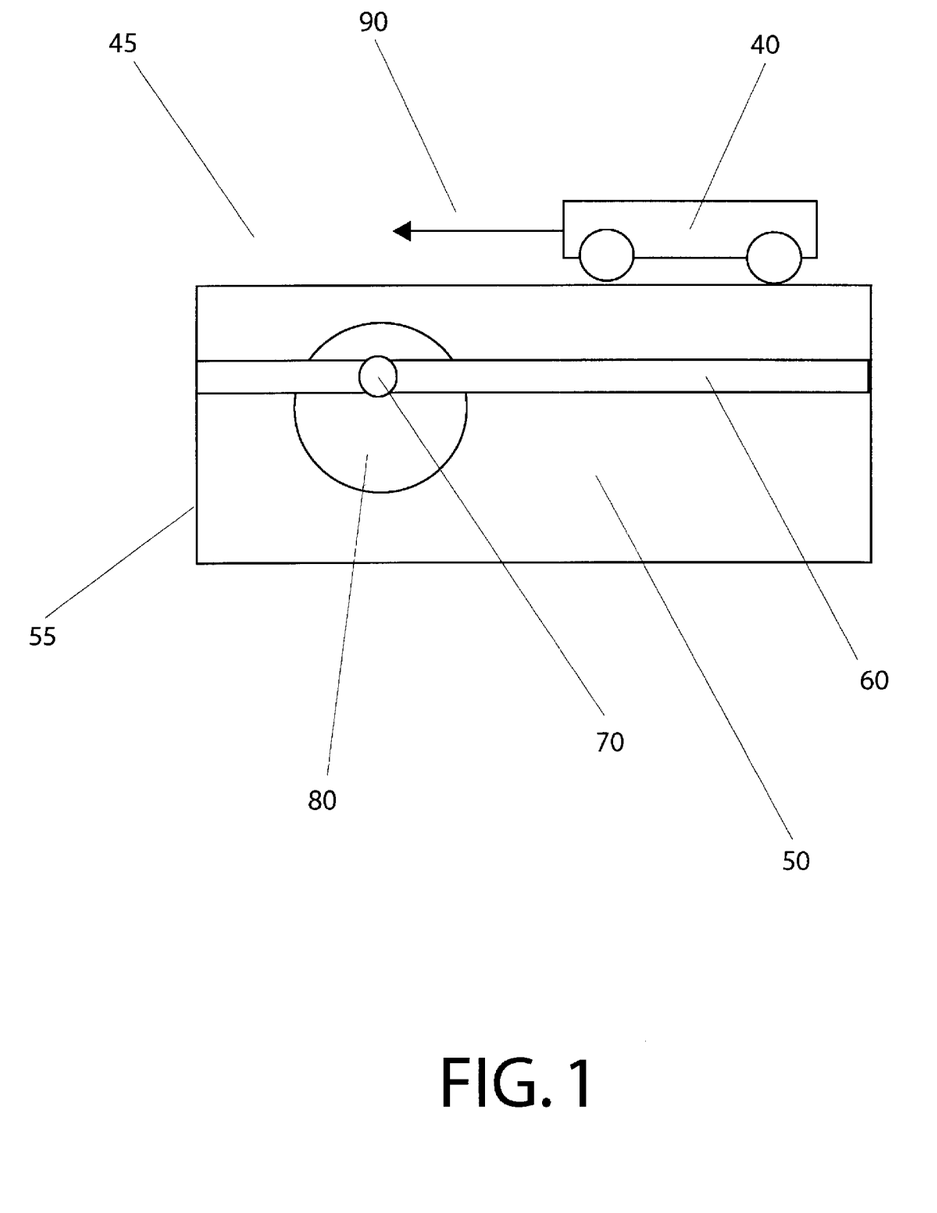
FIG. 1 illustrates an embodiment of the present invention in which a vehicle containing a radar system, an induction system, and an acoustic system is moved over a subsurface region containing a buried water pipe with a leak.
Figure 2:
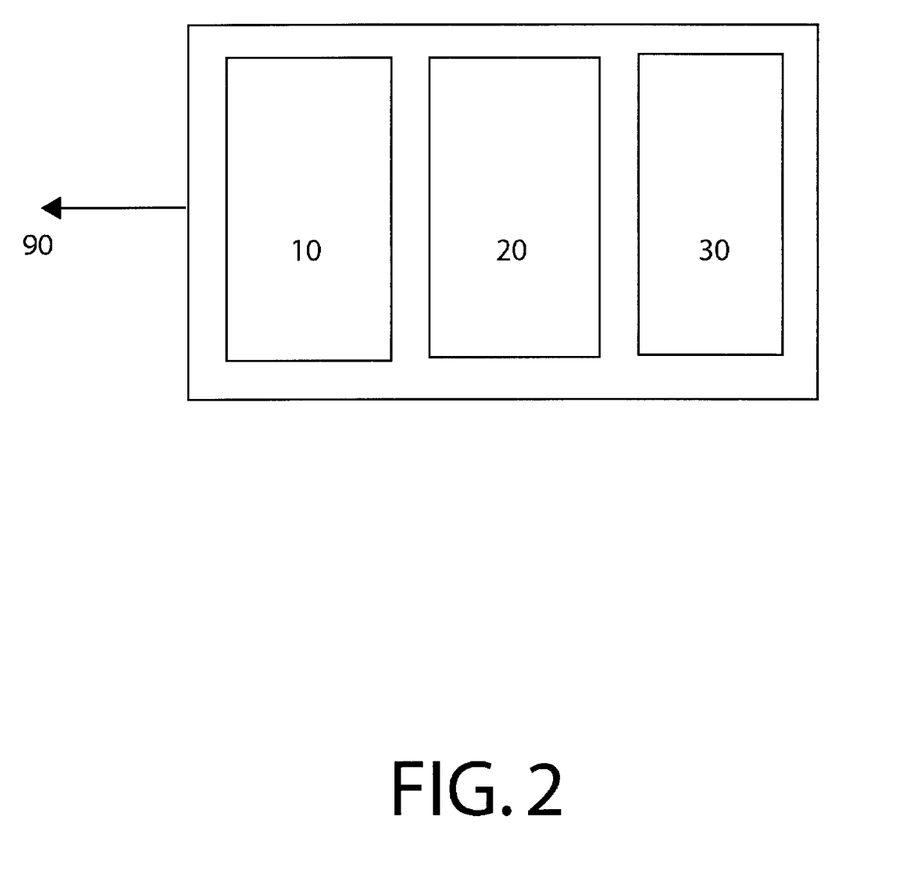
FIG. 2 illustrates a top view of the vehicle illustrated by FIG. 1.

As shown in FIGS. 1 and 2, radar system 10, induction system 20, and acoustic system 30 may be mounted on vehicle 40. Vehicle 40 may then be moved through air 45 over subsurface region 50 of ground 55 in the direction of motion indicated by arrow 90. Subsurface region 50 contains buried water pipe 60 having leak 70 surrounded by wet soil region 80. A top view of vehicle 40 from FIG. 1 is shown in FIG. 2.

For most soils, a leaking fresh-water pipe will create a wet soil region in the vicinity of the leak in which the electromagnetic wave speed is lower and/or the electrical conductivity is higher than in the surrounding dry soil. Radar data may be processed to determine estimates for the electromagnetic wave speed in the subsurface, and in particular to detect subsurface discontinuities that may reveal buried utility lines and interfaces between dry and wet soil. The induction measurements may be processed to obtain estimates of the conductivity in the subsurface. The acoustic system "listens" for the characteristic sound of leaking water. By passing the results of radar, induction, and acoustic measurements through a leak-identification process, one may obtain estimates of possible leak locations. Acoustic measurements may be filtered to remove features from the acoustic signal that do not have the characteristics of a water leak. Such features might include traffic noise, for example. Estimates so obtained are superior to estimates based solely on one type of measurement. Vacuum excavation is a cost-effective way of verifying the locations of leaks without carrying out a full excavation. The present invention is able to detect leaks in metallic as well as in nonmetallic pipes.

We assume that the soil contains significantly more moisture in the vicinity of the leak than in surrounding areas, so that the moisture content of the soil can assist in locating the leak. As explained in Daniels, increasing the moisture content in soil causes the wave speed to decrease and/or the conductivity to increase. (The conductivity of certain soils, such as, for example, some sandy soils, is not necessarily increased by adding fresh water.) The radar data may be processed to determine estimates for the electromagnetic wave speed in the subsurface, and in particular to detect subsurface discontinuities that reveal buried utility lines and interfaces between dry and wet soil. The induction measurements may be processed to obtain estimates of the conductivity in the subsurface.

One aspect of the present invention involves the process of combining the radar and induction measurements to obtain a high-confidence estimate of the leak location that is superior to estimates based solely on radar or induction measurements. Another aspect of the present invention involves the process of combining radar-induction results with acoustic listening methods and/or vacuum excavation.

According to one aspect of the present invention, a leak is predicted in a certain region surrounding a pipe if it has been determined through radar and inductive surveys that the region has a lower wave speed and a higher conductivity than surrounding areas. The false alarm rate is lowered through the combination of these two methods.

According to a further aspect of the present invention, a leak is predicted in a certain region surrounding a pipe if (1) it has been determined through radar and inductive surveys that the region has a lower wave speed and a higher conductivity than surrounding areas and if (2) an acoustic listening device predicts a leak in the vicinity of that region. Again, the false alarm rate is lowered through the combination of these three methods.

According to an additional aspect of the present invention, a vacuum excavator may be used to provide a final confirmation of the existence of a leak, thus reducing the false alarm rate to zero.

EXEMPLARY SCENARIOS

The following scenarios are exemplary situations that may be encountered in practice in which the present invention may be used to obtain superior estimates of leak locations. These examples also provide optimal methods for collecting and processing data.

Pipe Visible to Radar

In this scenario, we assume that the leaking water pipe is visible to the radar. In good soil conditions (low soil conductivity), the radar is able to detect metallic as well as nonmetallic pipes. The radar image would show the pipe dipping (bending down) near the leak because of the decreased wave speed caused by the water. That is, the radar image (obtained with a layer model of the subsurface) of a straight pipe bends down when the pipe passes through regions with a slower wave speed. In addition, the radar image would show an amorphous region enclosing the wet-soil region. The radar data could also be processed with a layered subsurface model to determine an estimate of the wave speed as a function of depth to further enhance the accuracy of the estimated leak position.

A layered subsurface model in which the constitutive parameters of the soil vary only with depth can be conveniently characterized with plane waves as described in W. C. Chew, "Waves and Fields in Inhomogeneous Media," Van Nostrand, New York, 1990. A processing scheme that takes into account the layering can be constructed according to the method described in T. B. Hansen and P. M. Johansen, "Inversion scheme for ground penetrating radar that takes into account the planar air-soil interface," IEEE *Transactions on Geoscience and Remote Sensing*, Vol. 38, pp. 496–506, January 2000. Radar data is typically collected in monostatic or multistatic mode. In monostatic mode, the distance between the transmitting antenna and the receiving antenna is the same for all of the recorded return signals. With a radar array, the monostatic mode of operation can be achieved by letting each receiver record only those return signals that are due to the two nearest transmitters. In the multistatic mode of operation, each receiver records return signals from all transmitters and thus obtains recordings for varying transmitter-receiver spacings. The additional data recorded in multistatic mode may be stacked to produce better images of the subsurface. Monostatic and multistatic data collection is described in Johansson, et al.

Pipe Not Visible to Radar

In this scenario, we assume that the pipe is not visible to the radar. This scenario may occur when the pipe is deep or when the pipe is made of a material with small contrast to the surrounding soil. Also, high soil conductivity may prevent the radar from detecting the pipe. The radar image may show the boundary between wet and dry soil, even though the pipe itself is not visible to the radar. The radar data may also be processed with a layered subsurface model to determine an estimate of the wave speed as a function of depth.

Pipe Visible to Inductive System

In this scenario, we assume that the pipe can be seen clearly by the inductive system. This scenario would typically occur for metallic pipes. Also, large non-conducting water pipes buried in conductive soils may often be detected by an inductive system because of the conductivity void they create in the subsurface. (The induced eddy currents cannot flow in the region occupied by the non-conducting pipe, and the emitted magnetic fields reveal this void in the current distribution.) For most soil types, an analysis of the inductive data would reveal that the conductivity of the soil near the leak is higher than in surrounding regions.

Pipe Not Visible to Inductive System

In this scenario, we assume that the pipe is not visible to the inductive system. This scenario would typically occur if the pipe is made of a non-conducting material and the soil conductivity is low. (In this case, the radar would likely be able to locate both the pipe and the leak because of the low soil conductivity and the high permittivity contrast between the soil and the water flowing in the pipe.) For most soil types, an analysis of the inductive data would nevertheless reveal that the conductivity of the soil near the leak is higher than in surrounding regions, even though the pipe itself cannot be identified by the inductive system.

SPECIFIC EXAMPLES

The following examples illustrate the superiority of the present invention in the accurate detection of leaks over methods that rely solely on radar or induction:

Example 1

False Alarm With Induction Measurements Alone

In the first example, the use of induction measurements alone would result in an erroneous leak prediction. In particular, in this example an induction survey has revealed that a certain region near a water pipe has a higher conductivity than the surrounding areas. The soil in the high-conductivity region is dry clay (conductivity of 0.1 S/m and wave speed of $1.3 \times 10^8$ m/s) and the soil in the surrounding area is dry sand (conductivity of 0.01 S/m and wave speed of $1.3 \times 10^8$ m/s). (During excavation, soil that is removed from one hole is sometimes used to fill another hole, thereby creating soil pockets that are very different from the surrounding regions.) If only induction measurements were used, the high-conductivity region could erroneously be identified as wet soil, thereby causing a false leak prediction. However, a radar survey could determine that the high-conductivity region is not wet soil because the wave speed is not significantly lower in that region.

Example 2

Missed Detection With Induction Measurements Alone

In the second example, the use of induction measurements alone would fail to detect an actual leak. In particular, assume that the soil near the leak is wet sand with a conductivity of 0.01 S/m and a wave speed of $5.5 \times 10^7$ m/s. Assume also that the soil in the surrounding area is dry sand with a conductivity of 0.01 S/m and a wave speed of $1.3 \times 10^8$ M/s. Since the conductivity of each region is the same, an inductive system would not be able to detect the leak. However, a radar system could detect the leak because of the decreased wave speed in the wet region.

Example 3

Missed Detection With Radar Measurements Alone

In the third example, the use of radar measurements alone would fail to detect an actual leak. In particular, consider a water pipe that is buried at a depth of 3 meters in clay that has a conductivity of 0.1 S/m and a wave speed of $1.3 \times 10^8$ m/s. Assume that the region near the leak is wet clay with a conductivity of 1 S/m and a wave speed=$8.7 \times 10^7$ m/s. In this case, the dry soil is highly conductive and the radar waves cannot penetrate deeply enough to reach the wet soil. Hence, radar cannot detect the leak. An inductive system, however, can penetrate deeply enough to detect the highly conductive wet-clay region, thus revealing the location of the leak.

As these examples illustrate, a leak detection system based on both radar and induction is more reliable than a system based solely on either radar or induction taken alone. Additional examples will be apparent to those of skill in the art from, for example, the soil-parameter table in Daniels (page 33).

In addition, by combining the radar and inductive measurements with an acoustic listening device, one may obtain an even more reliable leak detection system. For example, one of skill in the art can readily construct scenarios from the soil-parameter table in Daniels in which a leak that can be detected by the acoustic listening device cannot be detected by either a radar or an inductive system. Conversely, some leaks in nonmetallic pipes, which can be detected by the radar and induction systems, cannot be detected by the acoustic listening device.

Figure 3:
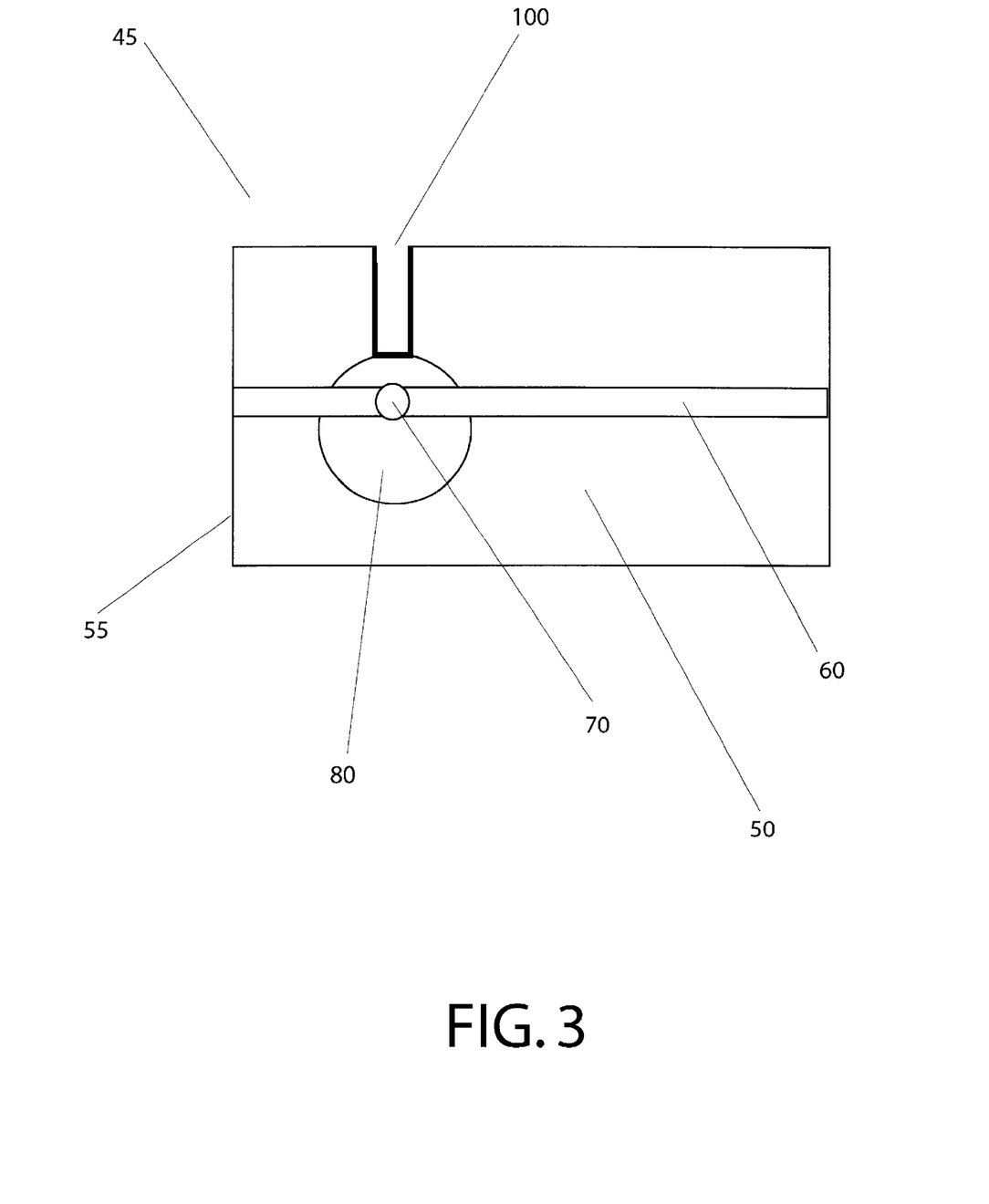
FIG. 3 illustrates a vacuum excavator uncovering a leak in a buried water pipe.

After a potential leak has been identified by the methods described above, a vacuum excavator may be used to verify that the potential leak is an actual leak. With vacuum excavation, one may avoid the high costs of performing a full excavation in an area that does not contain an actual leak. FIG. 3 illustrates a vacuum excavator uncovering a leak in a buried water pipe. In particular, test pit 100 created by a vacuum excavator exposes leak 70 in buried pipe 60.

In certain regions of the world, the conductivity of dry soil is so high that radar is ineffective. In such locales, induction, acoustic listening, vacuum excavation, or any combination of these methods could be used. In general, a subset of the tools herein disclosed may be selected based on known soil conditions.

CONCLUSION

The present invention, therefore, is well adapted to carry out the objects and obtain the ends and advantages mentioned above, as well as others inherent herein. All presently preferred embodiments of the invention have been given for the purposes of disclosure. Where in the foregoing description reference has been made to elements having known equivalents, then such equivalents are included as if they were individually set forth. Although the invention has been described by way of example and with reference to particular embodiments, it is not intended that this invention be limited to those particular examples and embodiments. It is to be understood that numerous modifications and/or improvements in detail of construction may be made that will readily suggest themselves to those skilled in the art and that are encompassed within the spirit of the invention and the scope of the appended claims.

We claim:

1. A method for detecting and locating leaks in buried pipes by radar and induction comprising:
   transmitting a ground penetrating radar signal into a subsurface region;
   receiving a return radar signal for said subsurface region;
   processing said return radar signal to create a processed return radar signal;
   transmitting an inductive signal into said subsurface region;
   receiving a return inductive signal from said subsurface region;
   processing said return inductive signal to create a processed return inductive signal; and,
   combining said processed return radar signal and said processed return inductive signal to detect and locate a leak in said subsurface region.

2. The method of claim 1 wherein said step of processing said return radar signal further comprises using a layer model of said subsurface region.

3. The method of claim 1 wherein said step of processing said return radar signal further comprises using multistatic transmitter-receiver geometry.

4. The method of claim 1 wherein said step of processing said return radar signal further comprises detecting an angular change in a straight pipe radar image.

5. The method of claim 1 wherein said step of transmitting an inductive signal further comprises using transient fields.

6. The method of claim 1 wherein said step of transmitting an inductive signal further comprises using single-frequency fields.

7. The method of claim 1 wherein said subsurface region includes a wet soil region and wherein said step of processing said return inductive signal further comprises using a spherical model of said wet soil region.

8. The method of claim 1 wherein said step of processing said return inductive signal further comprises using a layered model of said subsurface region.

9. The method of claim 1 wherein said combining step further comprises the steps of:
   identifying from said processed return radar signal and said processed return inductive signal a first region within said subsurface region having a first wave speed and a first conductivity;
   identifying from said processed return radar signal and said processed return inductive signal a second region within said subsurface region disjoint from said first region and having a second wave speed and a second conductivity; and,
   detecting a leak in said second region if (1) said second wave speed is less than said first wave speed and if (2) said second conductivity is greater than said first conductivity.

10. The method of claim 1 wherein said combining step further comprises the steps of:
    identifying from said processed return radar signal and said processed return inductive signal a first region within said subsurface region having a first wave speed and a first conductivity;
    identifying from said processed return radar signal and said processed return inductive signal a second region within said subsurface region disjoint from said first region and having a second wave speed and a second conductivity; and,
    detecting a leak in said second region if (1) said second wave speed is less than said first wave speed and if (2) said second conductivity is greater than said first conductivity and if (3) a vacuum excavator indicates the presence of a leak in said second region.

11. A method for detecting and locating leaks in buried pipes by radar, induction, and acoustic listening comprising:
    transmitting a ground penetrating radar signal into a subsurface region;
    receiving a return radar signal from said subsurface region;
    processing said return radar signal to create a processed return radar signal;
    transmitting an inductive signal into said subsurface region;
    receiving a return inductive signal from said subsurface region;
    processing said return inductive signal to create a processed return inductive signal;
    receiving an acoustic signal with an acoustic listening device;
    processing said acoustic signal to create a processed return acoustic signal;
    combining said processed return radar signal, said processed return inductive signal, and said processed acoustic signal to detect and locate a leak in said subsurface region.

12. The method of claim 11 wherein said step of processing said return acoustic signal further comprises using a leak-sound enhancer.

13. The method of claim 1 or claim 11 further comprising the step of applying vacuum excavation.

14. The method of claim 11 wherein said combining step further comprises the steps of:
    identifying from said processed return radar signal and said processed return inductive signal a first region within said subsurface region having a first wave speed and a first conductivity;
    identifying from said processed return radar signal and said processed return inductive signal a second region within said subsurface region disjoint from said first region and having a second wave speed and a second conductivity; and,
    detecting a leak in said second region if (1) said second wave speed is less than said first wave speed and if (2) said second conductivity is greater than said first conductivity and if (3) said processed acoustic signal indicates the presence of a leak in said second region.

15. The method of claim 11 wherein said combining step further comprises the steps of:
    identifying from said processed return radar signal and said processed return inductive signal a first region within said subsurface region having a first wave speed and a first conductivity;
    identifying from said processed return radar signal and said processed return inductive signal a second region within said subsurface region disjoint from said first region and having a second wave speed and a second conductivity; and,
    detecting a leak in said second region if (1) said second wave speed is less than said first wave speed and if (2) said second conductivity is greater than said first conductivity and if (3) said processed acoustic signal indicates the presence of a leak in said second region and if (4) a vacuum excavator indicates the presence of a leak in said second region.

16. An apparatus for detecting a leak in a buried pipe, comprising:
- a ground penetrating radar transmitter for transmitting a radar signal into a subsurface region;
- a radar receiver for receiving a return radar signal from said subsurface region;
- a radar signal processor for processing said return radar signal to create a processed return radar signal;
- an inductive signal transmitter for transmitting an inductive signal into said subsurface region;
- an inductive receiver for receiving a return inductive signal from said subsurface region;
- an inductive signal processor for processing said return inductive signal to create a processed return inductive signal; and,
- a data processor for combining said processed return radar signal and said processed return inductive signal to detect and locate a leak in said subsurface region.

17. The apparatus of claim 16 wherein said data processor further comprises:
- processing circuitry for identifying from said processed return radar signal and said processed return inductive signal a first region within said subsurface region having a first wave speed and a first conductivity and for identifying from said processed return radar signal and said processed return inductive signal a second region within said subsurface region disjoint from said first region and having a second wave speed and a second conductivity; and,
- detection circuitry for detecting a leak in said second region if (1) said second wave speed is less than said first wave speed and if (2) said second conductivity is greater than said first conductivity.

18. The apparatus of claim 16 wherein said radar signal processor uses a layer model of said subsurface region.

19. The apparatus of claim 16 wherein said radar signal processor further comprises processor circuitry for detecting an angular change in a straight pipe radar image.

20. The apparatus of claim 16 wherein said radar signal processor uses multistatic transmitter-receiver geometry.

21. The apparatus of claim 16 wherein said inductive signal transmitter uses transient fields.

22. The apparatus of claim 16 wherein said inductive signal transmitter uses single-frequency fields.

23. The apparatus of claim 16 further comprising an acoustic listening device receiving an acoustic signal and wherein said data processor further combines said acoustic signal with said processed return radar signal and said processed return inductive signal to detect and locate a leak in said subsurface region.

24. The apparatus of claim 16 further comprising a vacuum excavator for verifying a leak detected and located by said data processor.

25. A method for detecting a leak in a pipe buried in soil comprising:
- determining the conductivity of said soil;
- determining the wave speed of said soil;
- selecting a first leak detector and a second leak detector based on said conductivity and said wave speed;
- applying said first leak detector to said soil to receive a first return signal;
- applying said second leak detector to said soil to receive a second return signal; and, combining said first return signal and said second return signal to detect said leak.

26. The method of claim 25 wherein said first leak detector is a ground penetrating radar system and said second leak detector is an induction system.

27. The method of claim 25 wherein said first leak detector is a ground penetrating radar system and said second leak detector is an acoustic system.

28. The method of claim 25 wherein said first leak detector is a ground penetrating radar system and said second leak detector is a vacuum excavator.

29. The method of claim 25 wherein said first leak detector is an induction system and said second leak detector is an acoustic system.

30. The method of claim 25 wherein said first leak detector is an induction system and said second leak detector is a vacuum excavator.

31. The method of claim 25 wherein said first leak detector is an acoustic system and said second leak detector is a vacuum excavator.

* * * * *